A. FAY.
AERATING CLOTHES WASHER.
APPLICATION FILED OCT. 26, 1912.
1,114,974.
Patented Oct. 27, 1914.
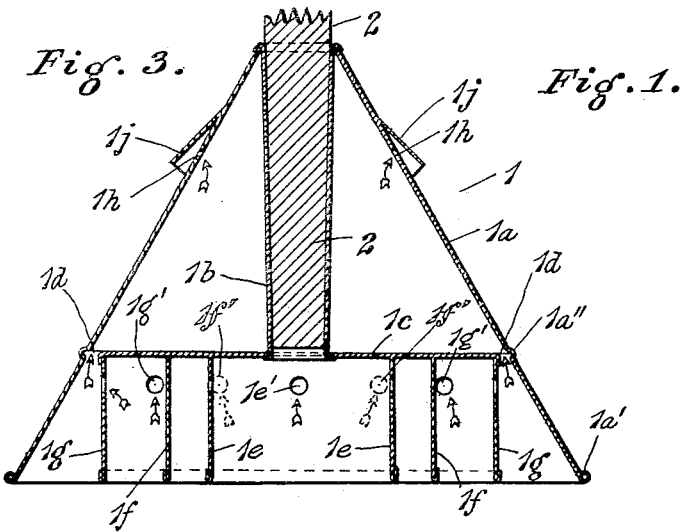
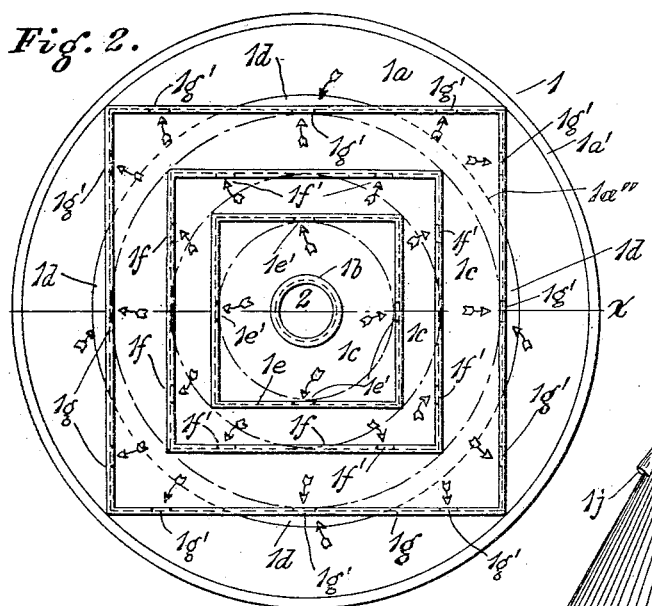
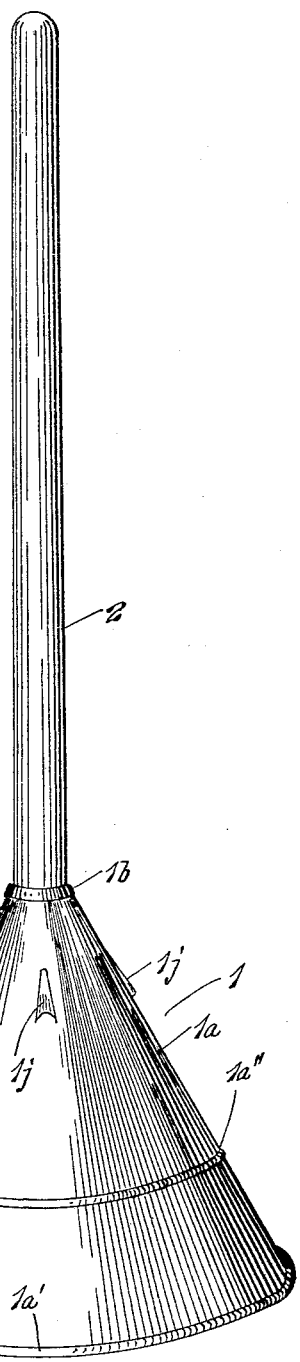
Witnesses:
Inventor
Alpheus Fay

UNITED STATES PATENT OFFICE.

ALPHEUS FAY, OF LOUISVILLE, KENTUCKY, ASSIGNOR TO J. HENRY BUDDEKE.

AERATING CLOTHES-WASHER.

1,114,974.  Specification of Letters Patent.  Patented Oct. 27, 1914.

Application filed October 26, 1912. Serial No. 728,003.

*To all whom it may concern:*

Be it known that I, ALPHEUS FAY, a citizen of the United States, residing at Louisville, in the county of Jefferson and State of Kentucky, have invented a certain new and useful Aerating Clothes-Washer, of which the following is a specification.

My invention relates to washing apparatus, and has for its object the lightening of the labor of washing clothes and other fabrics, and at the same time lessening the wear and tear on the articles washed.

My invention consists in the parts and in the details of construction and arrangement of parts as will hereinafter be more fully described and claimed.

In the drawing: Figure 1 is a perspective view of a device embodying my invention. Fig. 2 is a bottom plan view of the same. Fig. 3 is a vertical section on the line $x$—of Fig. 2.

Broadly described, the apparatus comprises a vacuum chamber 1, with a handle 2, the chamber being conical and open at its base, with the handle joining it at the region of its apex.

The outer conical shell $1^a$ of the chamber 1 has, preferably, a wire-reinforced lower edge or rim $1^{a'}$, and has an upper edge or top consisting of a frustum due to the removal of the apex to admit the handle 2, which upper edge is overlapped by the flanged upper end of a central tube $1^b$. This tube $1^b$ receives the handle 2; it extends down to a diaphragm $1^c$, inside the shell $1^a$, and, passing through a central opening in the diaphragm, has its lower end flanged thereunder. This tube preferably tapers downwardly, and the handle 2 is correspondingly shaped, so that the handle may be wedged into the tube and thus securely held to the shell $1^a$.

The diaphragm $1^c$ extends horizontally across the interior of the shell at about one-third of its height. This diaphragm does not completely fill the circumference of the conical shell in its plane, but is of a shape that may be described as a square, with its corners cut away by arcs. It is in the regions of its periphery defined by these arcs that it is joined to the shell $1^a$. To facilitate this joining, and to reinforce it, the shell has an annular bead $1^{a''}$, concave inwardly, receiving the arc-shaped edges of the diaphragm. It will be seen that this construction leaves segmental openings $1^d$ along the straight parts of the edges of the diaphragm, as is best seen in Fig. 2.

Extending downwardly, perpendicular to the diaphragm, are a series of concentric rectangular walls, $1^e$, $1^f$ and $1^g$, each with its upper edge secured to the lower side of the diaphragm $1^c$, as by soldering, and with its lower edge turned up to present a smooth edge downwardly, in manner similar to the downwardly presented edge of the shell $1^a$ itself. These lower edges of the walls may lie even with the lower rim of the shell, or slightly above it. The outermost wall, $1^g$, lies approximately in the region of the straight parts of the diaphragm edge, and the parts of the diaphragm in these regions are flanged down over the outer side of the wall. Furthermore, this outer wall, with its corners meeting the rim of the shell, is cut away upwardly, as may be understood, to conform to the inner surface of the conical shell and be joined tightly therewith. Thus, a box is formed below the diaphragm, containing a series of concentric compartments. Finally, each of the walls $1^e$, $1^f$ and $1^g$, is pierced by a series of holes $1^{e'}$, $1^{f'}$, and $1^{g'}$, respectively, so that there may be communication between all the compartments and from them up through the segmental openings into the upper region of the shell, above the diaphragm $1^c$, around the handle-tube $1^b$. This upper region has a series of openings $1^h$, about one-third of the way down from the handle, each of which has a hood $1^j$ over it, on the outside of the shell.

It is through the various openings above described that the commingled air and water escape when the washer is pushed down into the water with its mouth or open base in contact with the fabrics to be washed. The action is such as to produce a series of alternating compressions and expansions of air in the chamber, involving alternate excess of air pressure and vacuum therein. The result is to cause the air to be forced, together with the water, in alternate directions through the fabrics at the mouth of the chamber.

The vacuum created interiorly of the chamber upon attempt to raise the washer vertically from the bottom of its stroke is of such degree that it is necessary to tilt the washer, using the handle 2 as a lever, thus breaking the contact of the lower edges of the washer with the fabrics to an extent sufficient to relieve the vacuum and allow the raising of the washer with ease, ready for the next stroke.

An especially beneficial feature of my improvement is the arrangement of the concentric rectangular walls 1ᵉ, 1ᶠ, and 1ᵍ so that the diagonal of an inner one equals the diameter of the next outer one; i. e., of each two adjacent, the inner one is inscribed in a circle around which the outer one is circumscribed, as indicated by the dotted circles on the plan view in Fig. 2. This results in causing the edges of the walls to come into intimate physical contact with every particle of the clothes during a succession of rotations of the washer corresponding to a series of up and down operations of it.

The arrangement of the diaphragm, and the circuitous but unobstructed path of travel of the air and water through the various openings causes effective compression and expansion, and at the same time serves to comminute the water or other cleansing fluid and thoroughly distribute the soap or other agent used therein.

The hoods 1ʲ over the holes 1ʰ in the shell 1ᵃ serve to cause upward inward or downward outward currents of air and water, as the apparatus is manipulated.

The tapered tube 1ᵇ, receiving the tapered part of the handle 2, serves, by its connection with the apex region of the shell, and with the central region of the diaphragm, to reinforce the entire apparatus. Owing to the taper, the handle may be readily removed or replaced, even when swelled by the action of the hot fluids; and when in place, it is firmly held, as is necessary for thorough and efficient manipulation of the device.

Having fully described my invention, what I claim as new and desire to secure by Letters Patent is:

1. An aerating clothes washer comprising a conical vacuum chamber, a horizontal diaphragm therein, a series of rectangular concentric walls below the diaphragm, an inner one of said walls being inscribed in a circle around which an adjacent outer one is circumscribed, said conical chamber having an open mouth in which said walls present their lower edges, said walls having perforations, and said diaphragm having its portions inside the walls imperforate and having straight sides leaving segmental openings past the walls inside the inner wall of the conical chamber, and the portion in the conical chamber above the diaphragm having openings to the exterior of the chamber, for the purposes described.

2. An aerating clothes washer comprising a vacuum chamber with curved walls, a diaphragm therein with a straight edge leaving an opening between it and the adjacent curved wall of the chamber, said diaphragm being imperforate, interiorly and said opening leading from below to above said diaphragm in said chamber, and a series of inclosing and inclosed compartment-forming walls below said diaphragm, said walls having perforations forming communication between the compartments formed by the walls, and from them to the opening past the diaphragm.

3. An aerating clothes washer comprising a conical vacuum chamber, a horizontal diaphragm therein rigidly secured to the inner sides of the conical vacuum chamber at separate intervals therearound, and a series of rectangular inclosing and inclosed compartment-forming walls below the diaphragm, with their upper edges rigidly secured to the diaphragm and thereby reinforcing said diaphragm, the outer walls of the series joining the diaphragm in the intervals along its edges between the intervals where the diaphragm is secured to the inner sides of the vacuum chamber, and having the parts adjacent to the corners of the walls cut away and fitted to and rigidly secured to said inner sides of the conical vacuum chamber, whereby these outer walls of the series reinforce the structure of the vacuum chamber in addition to reinforcing the diaphragm.

ALPHEUS FAY.

Witnesses:
CLARENCE PERDEW,
CHAS. C. DAVIS.